United States Patent

Schulze, Sr.

[15] 3,643,930
[45] Feb. 22, 1972

[54] APPARATUS FOR ADDING MOISTURE TO AIR

[72] Inventor: James L. Schulze, Sr., Middletown, Ky.
[73] Assignee: General Electric Company
[22] Filed: May 4, 1970
[21] Appl. No.: 34,495

[52] U.S. Cl. .................................... 261/97, 261/DIG. 46
[51] Int. Cl. ................................................. B01d 3/04
[58] Field of Search ......................... 261/DIG. 46, 97

[56] References Cited

UNITED STATES PATENTS

| | | | |
|---|---|---|---|
| 3,339,902 | 9/1967 | Martin | 261/DIG. 46 |
| 3,456,927 | 7/1969 | Martin et al. | 261/DIG. 46 |
| 2,646,061 | 7/1953 | Bottum | 261/97 |
| 2,828,761 | 4/1958 | Weibert, Jr. | 261/97 |
| 3,386,711 | 6/1968 | Williams | 261/DIG. 46 |
| 3,481,588 | 12/1969 | Lobb | 261/DIG. 46 |
| 3,430,823 | 3/1969 | Hunsaker | 261/DIG. 46 |
| 3,315,948 | 4/1967 | Martin | 261/DIG. 46 |

*Primary Examiner*—Tim R. Miles
*Assistant Examiner*—Steven H. Markowitz
*Attorney*—Harry B. O'Donnell, III, Francis H. Boos, Jr., Frank L. Neuhauser, Oscar B. Waddell and Joseph B. Forman

[57] ABSTRACT

Improved apparatus is provided for adding moisture to air. The apparatus includes hollow cabinet means, having an air inlet and outlet, and humidifier means for adding moisture to an air stream flowing between the inlet and outlet. The humidifier means includes evaporative media means mounted for movement across the air stream and through a moisture reservoir that is supplied with liquid, such as tap water or the like. In accordance with the present invention, means are provided for purging or draining fluidized material, such as tap water and the mineral salts precipitated therefrom, from the reservoir and these drain means include a fluid inlet that is connected to the reservoir via siphon means comprising conduit means including an inverted generally U-shaped section.

6 Claims, 4 Drawing Figures

INVENTOR.
JAMES L. SCHULZE, SR.
BY
HIS ATTORNEY 3,643,930

APPARATUS FOR ADDING MOISTURE TO AIR

BACKGROUND OF THE INVENTION

This invention relates to improved apparatus for adding moisture to air and, more particularly, to apparatus of this sort comprising hollow cabinet means having an air inlet and outlet, humidifier means including evaporative media means mounted for movement across the air stream and through a moisture reservoir, and means for draining fluidized material from the reservoir. The present invention is also concerned with providing novel unitized means to serve both as the humidifier moisture reservoir and also to collect condensate that drips from cooling coil means located adjacent the humidifier.

Previously, one of the most distressing problems in designing apparatus for adding moisture to air has been the disposal of the mineral deposits or salts that are precipitated from the tap water, which is generally used as the humidifier moisture source liquid. These mineral deposits or salts are precipitated onto the evaporative media means and into the moisture reservoir when the level of minerals in the moisture source liquid reaches and exceeds the saturation point. Of course, these mineral deposits or salts must be removed from the reservoir, lest they eventually fill the same and thus render the humidifier device inoperative. Heretofore, various means have been provided for removing these salts or mineral deposits from the humidifier moisture reservoir. Some of these prior art schemes, such as those illustrated in U.S. Pat. No. Re. 26,243 and U.S. Pat. No. 3,315,948, provide means which continually drain a portion of the fluid from the reservoir and thus require considerable expenditures for water. Others, such as that described in U.S. Pat. No. 3.456,927, while providing for only periodic draining of the reservoir, employ an air-operated drain valve which is most complex in construction and operation and hence quite expensive to utilize. All of these prior art means have been expensive to build, operate and maintain and have been inefficient in operation when compared with the present invention.

SUMMARY OF THE INVENTION

In accordance with the present invention, it has been found that the aforenoted prior art problems can be overcome by the improved apparatus provided by the present invention. Basically, this apparatus includes hollow cabinet means, having an air inlet and outlet, and humidifier means for adding moisture to an air stream flowing between the air inlet and outlet. The humidifier means includes evaporative media means mounted for movement across the air stream and through a moisture reservoir which is supplied with liquid, such as tap water or the like. In accordance with one aspect of the present invention, means are provided for draining fluidized material, such as the moisture source liquid and the mineral salts precipitated therefrom, from the reservoir and these drain means include a fluid inlet that is connected to the reservoir via siphon means comprising conduit means including an inverted generally U-shaped section. Preferably, valved means are provided for supplying the liquid to the moisture reservoir, along with first control means for controlling the valved means to maintain a level of liquid within the reservoir that is sufficiently high to supply liquid to the media means but below the bight portion of the inverted section, and second control means for periodically overriding the first control means and thus causing the valved means to admit sufficient liquid into the reservoir to raise the fluid level therein above the bight portion and thereby initiate periodic purging or draining of the fluidized material from the reservoir via the drain means.

In accordance with another aspect of the present invention, novel unitized means is provided to serve both as the humidifier moisture reservoir and also to collect condensate that drips from cooling coil means located adjacent the humidifier means.

BRIEF DESCRIPTION OF THE DRAWING

The present invention is illustrated in the accompanying drawing, wherein.

DESCRIPTION OF THE PREFERRED EMBODIMENTS

Figure 1:
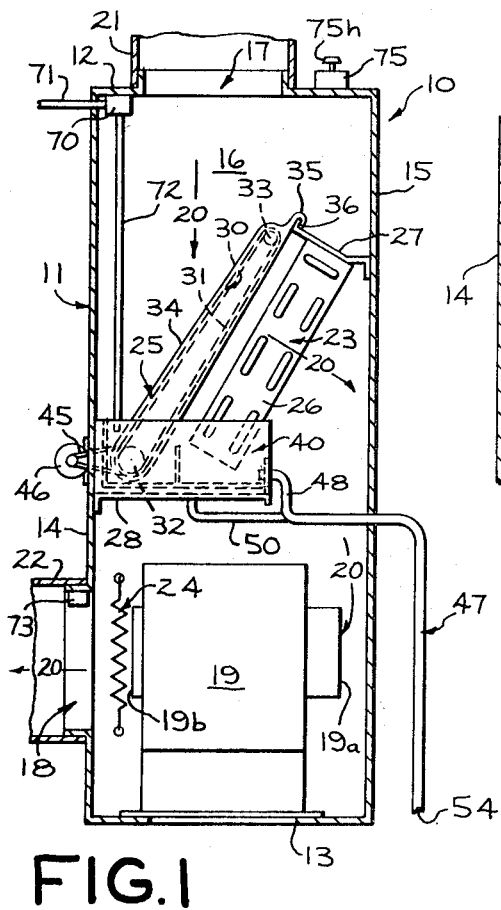
FIG. 1 is a somewhat schematic, partly sectioned, front elevational view of an air conditioning unit employing a presently preferred form of the present invention.
Figure 2:
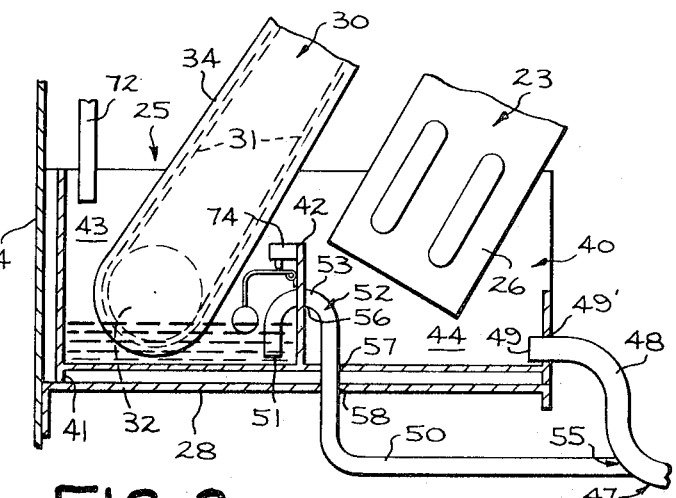
FIG. 2 is a greatly enlarged fragmentary view showing certain details of construction of the present invention illustrated in FIG. 1.

Referring now to the drawing and, more particularly, to FIGS. 1 and 2 thereof, there is illustrated, somewhat schematically, an air-conditioning unit 10 incorporating a presently preferred form of the improved apparatus provided in accordance with the present invention. As shown, the air conditioning unit 10 comprises a vertically arranged hollow cabinet 11, typically formed of sheet metal or similar material. The cabinet 11 includes a top wall 12, a bottom wall 13, left and right sidewalls 14 and 15, a rear wall 16 and a front wall which has been removed for purposes of clarity of illustration.

As shown in FIG. 1, the hollow cabinet 11 has an air inlet opening 17 through its top wall 12 and an air outlet opening 18 through the lower part of its left sidewall 14, and electrically powered fan or blower means 19, having a suction port 19a and a discharge port 19b, are mounted within the lower portion of the cabinet 11 for conveying a stream of air as indicated by the arrows 20 through the cabinet 11 between the cabinet air inlet 17 and outlet 18. Of course, the cabinet air inlet 17 is connected by duct means 21 to the room "return air" inlets (not shown), while the cabinet air outlet 18 is connected by other duct means 22 to the room "conditioned air" outlets (not shown).

Although it should be understood at the outset that the improved means provided by the present invention may be used with various forms of air-conditioning units, the particular form of air-conditioning unit 10 illustrated in FIG. 1 is provided with generally conventional cooling coil means 23 for removing heat from the air stream 20 flowing through the cabinet 11 and conventional heater means 24 for adding heat to the air stream 20, but is further provided with a presently preferred form of the novel humidifier means 25 which are constructed in accordance with the present invention and will be described in greater detail hereinafter.

As somewhat schematically illustrated in FIG. 1, the cooling coil means 23 comprises a conventional evaporative cooling coil bundle 26 of the so-called split-system variety of air cooling system. The coil bundle 26 is mounted within the hollow cabinet 11 by bracket means 27 fastened on the interior of the upper part of the cabinet right sidewall 15 and is arranged to slope downwardly and leftwardly across the air stream 20, terminating at a point spaced above second bracket means 28 that are fastened to the interior of the cabinet left sidewall 14 and extend generally horizontally therefrom over the blower means 19. And, in the particular form of the air-conditioning unit 10 illustrated in FIG. 1, the heater means 24 is schematically shown as being mounted on the lower part of the cabinet rear wall 16 between the discharge port 19b of the blower means 19 and the cabinet air outlet opening 18. As noted previously, the heater means 24 is conventional and may be either electrically powered or gas or oil-fired.

Turning now to the presently preferred form of the improved humidifier means 25 that is provided in accordance with the present invention and looking especially at FIGS. 1 and 2 of the drawing, it can be seen that this presently preferred form includes evaporative media means 30, preferably in the form of an endless belt 31, which may be made of various types of material, such as double-woven wire belting, porous fabric, open cell foam, or the like. As illustrated in FIGS. 1 and 2, the belt 31 is strung around a drive roll 32 and an idler roll 33, which are, in turn, spaced apart from one another and rotatably journaled in belt frame means 34 mounted adjacent to the cooling coil bundle 26 but upstream of the pattern of airflow 20 through the cooling coil bundle 26. As more specifically shown in FIG. 1, the upper edge of the belt frame means 34 is provided with hooklike first mounting means 35 which are engageable with complementary second mounting means 36 provided on the upper edge of the cooling coil bundle 26, whereby the belt frame means 34 is supported by the cooling coil bundle 26 which is, in turn, supported by the aforenoted first bracket means 27 provided on the upper interior of the cabinet right sidewall 15. Thus, the major planes of both the humidifier belt 31 and the cooling coil bundle 26 are arranged generally parallel to one another with the belt 31 being movable across the air stream 20 and having its lower end wrapped around the lower one of the two rolls 32 and extending downwardly and leftwardly to a point spaced below the lower left corner of the cooling coil bundle 26, but spaced above, and apart from, the second bracket means 28.

The structure thus far described requires means for collecting condensate that drips downwardly off the cooling coil bundle 26 during operation of the air-conditioning unit 10 in its cooling mode, lest this dripping condensate causes problems to equipment, such as the blower means 19, that is located within the lower part of the cabinet 11. And, reservoir means are required for supplying moisture to the belt 31 of the evaporative media means 30 which, in turn, adds this moisture of the air stream 20 flowing between the cabinet air inlet 17 and outlet 18. Heretofore, separate means have been employed to perform these condensate drip collecting and moisture reservoir functions. However, in accordance with one aspect of the present invention, unitized means 40 is provided for performing both of these two functions. As shown in FIGS. 1 and 2, this unitized means 40 comprises a single generally rectangular, panlike member which is provided with feet 41 that rest atop the aforenoted second bracket means 28 and is located in the space provided between this second bracket means 28 and the left bottom edges of the evaporative media means belt 31 and the cooling coil bundle 26.

In the form of the present invention illustrated in FIGS. 1 and 2, unitized means 40 has integrally formed weir means 42 which subdivide it into a reservoir portion 43 that extends under the lower left edge of the evaporative media belt 31 and a condensate drip collection portion 44 that extends under the lower left edge of the cooling coil bundle 26. The evaporative media belt 31 is moved across the air stream 20 and through the moisture reservoir portion 43 of the unitary means 40 by rotation of the drive roll 32 which is itself rotated by a drive belt 45 that is connected to the rotary output shaft of an electric motor 46 mounted on the exterior of the cabinet left sidewall 14.

As further shown in FIGS. 1 and 2, drain means 47 are provided for draining fluid from the unitized means 40. As best shown in FIG. 2, the presently preferred form of these drain means 47 includes first drain means comprising a first conduit means 48 having a first fluid inlet 49, which extends through an opening 49' provided at the bottom of the right sidewall of the unitary means 40, and is directly connected to the drip collection portion 44 of the unitized means 40 and second drain means comprising second conduit means 50 having a second fluid inlet 51 connected to the reservoir portion 43 of the unitized means 40 via siphon means that includes an inverted generally U-shaped conduit section 52. The inverted U-shaped conduit section 52 has its bight portion 53 located above the first fluid inlet 49 but below the top of the weir means 42. More specifically, the first fluid inlet 49 is connected to the drip collection portion 44 of the unitary means 40 just above the bottom thereof and the remainder of the first drain means conduit 48 extends rightwardly and downwardly therefrom with its outlet 54 being connected to a sewer system (now shown). The second fluid inlet 51 is vertically arranged over and spaced slightly above the bottom of the reservoir portion 43 of the unitary means 40 and forms a downward extension of the left leg of the inverted U-shaped conduit section 52 through which it is connected to the second drain means conduit 50. The bight portion 53 of this inverted U-shaped conduit section 52 extends through an opening 56 provided in the weir means 42, while the outlet 55 of the second drain means conduit 50 forms an extension of the right leg of the inverted U-shaped conduit section 52 and extends downwardly through an opening 57 provided in the bottom of the drip collection portion 44 of the unitary means 40 and another opening 58 provided in the second bracket means 28, and thence rightwardly and into connection with the first drain means conduit 48.

Figure 3:
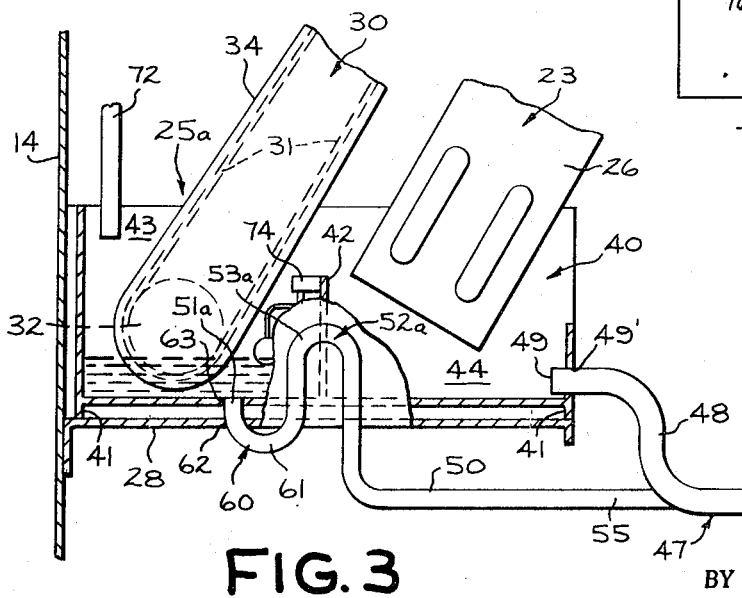
FIG. 3 is a view similar to FIG. 2, but illustrating an alternative form of the present invention; and, FIG. 4 is a simplified, schematic wiring diagram showing an electrical control circuit which may be utilized with the present invention.

FIG. 3 illustrates an alternative embodiment 25a of the present invention, which is otherwise generally similar to the preferred embodiment 25 illustrated in FIGS. 1 and 2, except that the fluid inlet for the second drain means conduit 50 is also connected to the reservoir portion 43 of the unitary means 40 through an upright generally U-shaped conduit section 60. As shown in FIG. 3, the bight portion 61 of this upright U-shaped conduit section 60 is located beneath the second bracket means 28 and the right bottom of the reservoir portion 43 of the unitary means 40, while its left leg extends upwardly through openings 62 and 63 which are respectively provided in the second bracket means 28 and the bottom of the reservoir portion 43 of the unitary means 40. The right leg of the upright U-shaped conduit section 60 extends upwardly externally of the unitary means 40 and is connected to the left leg of an alternative form of inverted U-shaped conduit section 52a which is also mounted externally of the unitary means 40 but has its bight portion 53a located at the same elevation as the aforenoted preferred form bight portion 53. With this alternative form 25a of the present invention (FIG. 3), only the openings 49', 62 and 63 need be provided and the need for openings 56, 57 and 58 is eliminated. Thus, this alternative form 25a reduces the three fluidtight connections which re, of course, required between the drain means conduit sections and the three openings 49', 56, 57 to only the one required at the opening 63. Furthermore, this alternative form 25a of the present invention has the advantage of providing an S-shaped trap between the fluid inlet 51a and the outlet 55 of the drain means conduit 50 that is connected to the reservoir portion 43 of the unitary means 40. Both of the aforedescribed embodiments 25 and 25a of the present invention are provided with similar means for supplying liquid, such as tap water or the like, to the moisture source reservoir portion 43 of the unitary means 40 and control means for controlling the input of this liquid to the reservoir portion 43 and for periodically purging or draining fluidized material, such as the moisture source liquid and the mineral salts precipitated therefrom, from the reservoir and out through the drain means 47 to the unshown sewer system.

Figure 4:
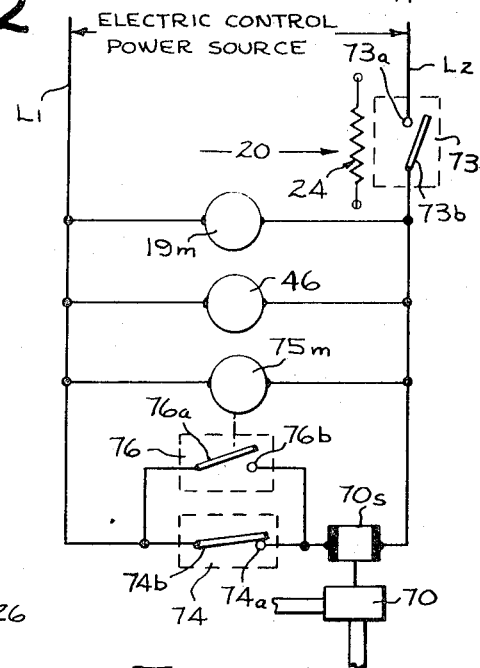

Turning now to the drawing, with particular reference to FIGS. 1 and 4 thereof, there are illustrated typical means which have been employed with success to perform these last-mentioned functions of liquid supply and control for both of the aforenoted embodiments 25 and 25a of the present invention. As illustrated, the means for supplying liquid to the reservoir portion 43 of the unitary means 40 comprises an electric solenoid valve 70 of the normally closed variety, which is suitably mounted on the interior of the cabinet top wall 12. This liquid supply means valve 70 has its inlet connected through a supply conduit 71 to a source of liquid, usually tap water, well water, or the like (not shown), and has its outlet connected through a discharge conduit 72 which extends downwardly over the top of the left end of the reservoir portion 43 of the unitary means 40. As best shown in the wiring diagram of FIG. 4, this normally closed liquid supply means valve 70 has its solenoid 70s connected in electrical series with the normally open contacts 73a and 73b of a thermally actuable switch 73 and the normally closed contacts 74a and 74b of a float switch 74 across a pair of electrical lines $L_1$ and $L_2$ which, in turn, are connected across an electric control power voltage source. As illustrated in FIG. 1, the thermally actuable switch 73 can be suitably mounted adjacent the cabinet air outlet 18 to thus sense the temperature of the air stream 20 following the addition of heat thereto by the heating means 24. And, as best shown in FIGS. 2 and 3, the float switch 74 can be mounted with its float located within the reservoir portion 43 of the unitary means 40 and arranged so as to maintain the level of liquid within the reservoir portion 43 at a so-called "normal" level that is sufficiently high to supply liquid to the lower left end of the evaporation media means belt 31 but below the bight portions 53 or 53a of the inverted generally U-shaped sections 52 or 52a of the second drain conduit means 50 of either of the aforedescribed embodiments 25 or 25a of the present invention.

As further shown in FIGS. 1 and 4, the blower 19 has its motor 19m connected across the electric control power source in electrical series with the normally open contacts 73a and 73b of the thermally actuable switch 73 but in electrical parallel with the series-connected normally closed contacts 74a and 74b of the float switch 74 and the solenoid 70s of the normally closed liquid supply valve 70. Similarly, the drive motor 46 for the movable evaporative media means belt 31 and an electric drive motor 75m for an adjustable timer 75, that is mounted atop the upper right part of the cabinet top wall 12, are each connected across the control power lines $L_1$ and $L_2$ in electrical series with the normally open contacts 73a and 73b of the thermally actuable switch 73 but in electrical parallel with the series-connected normally closed contacts 74a and 74b of the float switch 74 and the solenoid 70s of the normally closed liquid supply valve 70. And, in further accordance with the present invention, there is provided a purge or flush switch 76 which has its normally open contacts 76a and 76b connected in electrical parallel with the float switch 74 and mechanically connected to the timer through cam means or the like (not shown).

Prior to commencement of operation of the aforedescribed apparatus, the timer 75 is manually set by the operation of means such as the rotary handle 75h shown in FIG. 1 to cause closure of the normally open contacts 76a and 76b of the purge switch 76 periodically after the elapse of an adjustable predetermined length of time and to cause these contacts 76a and 76b to remain closed for an adjustable predetermined length of time. Following this, automatic operation of the apparatus then commences when the temperature level around the thermally actuable switch 73 at the cabinet air outlet 18 reaches the temperature level required to actuate it to close its normally open contacts 73a and 73b. This energizes the blower motor 19m, the evaporative media belt drive motor 46 and the timer motor 75m and, whenever the liquid level in the reservoir portion 43 of the unitary means 40 is below the aforenoted "normal" level and the float switch contacts 74a and 74b are closed, also energizes the solenoid 70s to open the normally closed liquid inlet valve 70 and admit liquid therethrough into the reservoir portion 43 until these contacts 74a and 74b are opened by the upward movement of the float of the switch 74 as the liquid reaches the so-called "normal" level.

As long as the temperature level around the thermally actuable switch 73 remains sufficient to continue its actuation and maintain closure of its normally open contacts 73a and 73b and energization of the blower motor 19m, evaporative belt drive motor 46 and the timer motor 75m, the air stream 20 will first be drawn downwardly from the room vents via the first duct means 21 and the cabinet air inlet 17 and through the evaporative media means belt 31, where it will receive moisture that is first acquired by the belt 31 during its movement through the liquid contained in the reservoir portion 43. Next, the moistened air will move rightwardly and downwardly through the cooling coil bundle 26, then, leftwardly through the blower suction port 19a and out of the blower discharge port 19b and across the heating means 24 where it has heat transferred to it and, finally, back to the room "conditioned-air" ducts through the second duct means 22.

As the moisture is thus transferred from the reservoir portion 43 of the unitary means 40 to the air stream 20 via movable evaporative media means belt 31, the liquid level in the reservoir 43 will, of course, from time to time be reduced sufficiently to cause the float of the float switch 74 to move downward to reclose its contacts 74a and 74b and thus energize the solenoid 70s of the solenoid valve 70 long enough to admit sufficient liquid through the liquid supply valve 70 to restore the liquid level in the reservoir portion to the so-called "normal" level. Hence, it can be seen that the solenoid valve 70 comprises valved means for supplying liquid to the reservoir portion 43 of the unitary means 40, while the float switch 74 comprises first control means for controlling the valved liquid supply means 70 to maintain the so-called "normal" level of liquid within the reservoir portion 43 that is sufficiently high to supply liquid to the evaporative media belt 31 but below the bight portion 53 or 53a of the inverted generally U-shaped conduit section 52 or 52a of the drain means 47 that is provided for draining the reservoir portion 43 of either of the aforedescribed embodiments 25 or 25a of the present invention.

If no control means other than the first control means 74 were provided for controlling the valved liquid supply means 70, the humidifier means 25 or 25a might possibly be rendered inoperative by the salts or mineral deposits which might be precipitated onto the evaporative media means belt 31 and into the moisture reservoir portion 43 of the unitized means 40 from the tap water, well water, or the like, that is generally supplied to the reservoir portion 43 via the valved liquid supply means 70, and thus clog the reservoir portion 43.

However, this potential clogging problem is avoided by the aforedescribed drain means 47 and by second control means which are provided in accordance with the present invention for periodically overriding the first control means 74 and thus causing the valved liquid supply means 70 to admit sufficient liquid into the reservoir portion 43 of the unitized means 40 to raise the fluid level therein above the bight portion 53 or 53a of the inverted U-shaped conduit section 52 or 52a of the second drain means conduit 50 of either of the aforenoted embodiments 25 or 25a and thus initiate flushing, purging and draining of fluidized material, such as the moisture source liquid and the mineral salts precipitated therefrom, from the reservoir portion 43 via these siphon means 52 or 52a and second drain means 50 to the unshown sewer means. More specifically, the second control means comprise the aforedescribed flush or purge switch 76 that is connected in electrical parallel with the first control means float switch 74 and is periodically actuated by the timer 75 after the elapse of an adjustable predetermined length of time to close its normally open contacts 76a and 76b and to cause these contacts 76a and 76b to remain closed for an adjustable predetermined length of time that is manually preset by the operation of means such as the timer handle 75h as indicated above. With this arrangement, the second control means 76 can be operated by the timer 75 to override the first control means 74 and thus temporarily take away control of the valved supply means 70 from the first control means 74, so that the valved liquid supply means 70 can be periodically caused to admit sufficient liquid into the reservoir portion 43 of the unitized means 40 to raise the fluid level therein above the bight portion 53 or 53a of the inverted U-shaped section 52 or 52a of the second drain means conduit 50 of either of the aforedescribed embodiments 25 or 25a of the present invention and thereby initiate flushing and draining of fluidized material, such as the moisture source liquid and the mineral salts precipitated therefrom, through the second drain means 50 via the siphon means 52 or 52a for discharge through the combined drain means outlet 54 into the system (not shown).

Preferably, the relative sizing of the valved liquid supply means 70 and the second drain and siphon means 50 and 52 or 52a is arranged such that the rate of fluid drainage via the second drain means 50 should exceed the liquid input rate via the valved liquid supply means 70. It should be noted, however, that should the rate of liquid input into the reservoir portion 43 exceed the rate of fluid drainage through the second drain means 50, the fluid can spill over the top of the weir means 42 and be subsequently discharged to the unshown sewer system via the first drain means 48 and the outlet 54 of the combined drain means 47.

It should, of course, be understood that the frequency and duration of this flushing or purging period should be varied in accordance with the levels of concentration of the mineral deposits or salts in the particular moisture source liquid that is employed. Good results have been achieved when using tap water supplied by the Louisville, Kentucky, Water Company as the moisture source liquid by setting the timer 75 to operate to close second control means purge switch contacts 76a and 76b for a 6-minute interval after each 8-hour period of closure of the normally opened contacts 73a and 73b of the thermally actuable switch 73. This can be varied through manual means such as operation of the timer handle 75h, with the length of the flushing or purge period being made greater and more frequent when using a moisture source liquid containing higher concentrations of mineral salts, or shorter and less frequent for source liquids containing lesser concentrations of mineral salts.

It should further be understood that the aforedescribed operation is concerned only with the heating mode of the air conditioner 10. Obviously, it is not intended that the normally open contacts 73a and 73b of the thermally actuable switch 73 should be closed during the cooling mode of the air-conditioning unit. Thus, it should be understood that, during this cooling mode, these contacts 73a and 73b are intended to remain open and thus prohibit operation of the valved liquid supply means 70, the timer 75, the evaporative media belt means drive motor 46, or the blower motor 19m by the circuitry illustrated in the wiring diagram of FIG. 4. During this cooling mode, it is intended that the unitized means 40 shall serve only to collect condensate that drips downwardly from the cooling coil bundle 26 and into the drip collection portion 44 thereof, from which the collected condensate is intended to be drained through the first drain means 48 and discharged to the unshown sewer system via the outlet 54 of the combined drain means 47. However, it is to be noted, that, if the inlet 49 of the first drain means 48 should become clogged or blocked, the collected condensate could ultimately overflow the weir means 42 and into the reservoir portion 43 and be subsequently drained from the unitary means 40 to the unshown sewer means via the second drain means conduit 50 and the outlet 54 of the combined drain means 47.

It should be apparent to those skilled in the art that while there have been described what, at present, are considered to be presently preferred embodiment of this invention in accordance with patent statutes, changes may be made in the disclosed apparatus without actually departing from the true spirit and scope of this invention. It is, therefore, intended that the appended claims shall cover such modifications and applications as do not depart from the true spirit and scope of the present invention.

What is claimed is:

1. Apparatus for adding moisture to air, comprising:
   a. hollow cabinet means having an air inlet and an air outlet;
   b. humidifier means for adding moisture to an air stream flowing between said inlet and outlet, said humidifier means including evaporative media means mounted for movement across said air stream and through a liquid reservoir;
   c. valved means including an electrically powered valve for supplying liquid to said reservoir;
   d. drain means for draining fluid from said reservoir, said drain means including a fluid inlet connected to said reservoir via siphon means comprising conduit means including an inverted generally U-shaped section;
   e. first control means for controlling said electrically powered valve to maintain a level of liquid within said reservoir sufficiently high to supply liquid to said media means but below the bight portion of said inverted section; and
   f. second control means for periodically overriding said first control means and thus causing said electrically powered valve to admit sufficient liquid into said reservoir to raise the fluid level therein above said bight portion and thereby initiate draining of fluid from said reservoir via said drain means.

2. The invention of claim 1, wherein said media means comprises belt means.

3. The invention of claim 1, wherein said liquid comprises tap water.

4. The invention of claim 1, wherein the relative sizing of said valved means and said drain and siphon means is arranged such that the fluid drainage rate via said drain means should exceed the liquid input rate via said valved means.

5. The invention of claim 4, wherein said fluid inlet for said drain means is also connected to said reservoir via conduit means including an upright generally U-shaped section.

6. The invention of claim 1, wherein said fluid inlet for said drain means is also connected to said reservoir via conduit means including an upright generally U-shaped section.

* * * * *